US005177850A

United States Patent [19]

Hull et al.

[11] Patent Number: 5,177,850

[45] Date of Patent: Jan. 12, 1993

[54] FORCIBLE ENTRY TOOL

[76] Inventors: Harold L. Hull, 401 Canyon Way #43, Sparks, Nev. 89434; Patrick N. Dowden, 9400 Forest Vista Way, Elk Grove, Calif. 95758

[21] Appl. No.: 770,464

[22] Filed: Oct. 3, 1991

[51] Int. Cl.[5] ..................... B23P 19/04

[52] U.S. Cl. ..................... 29/254; 29/275

[58] Field of Search ..................... 273/67 R, 84 R, 81 R; 173/90, 126; 405/271; 125/40; 404/133; 29/254, 255, 275

[56] References Cited

U.S. PATENT DOCUMENTS 2,490,684 4/1946 Gosselin .
2,754,585 7/1956 Green .
3,219,316 5/1964 Fried .
3,245,482 4/1966 Williams et al. .................... 173/126
3,348,870 8/1965 Zern .
3,710,407 1/1973 Reid .
3,712,389 1/1973 Smoak .
3,762,022 10/1973 Jeune .
4,201,368 5/1980 Vetter .
4,211,446 7/1980 Shultz, Sr. .
4,280,540 7/1981 Meachem .
4,362,194 12/1982 Lawson .
4,443,001 4/1984 Haerer .
4,657,225 4/1987 Hoehn et al. .
4,681,171 7/1987 Kee et al. .............................. 173/90
4,783,053 11/1988 Yirmiyahu et al. .
4,789,134 12/1988 Tenuto, Jr. et al. .
4,960,265 10/1990 Nichols . .
5,042,591 8/1991 Hull ...................................... 173/91
5,088,174 2/1992 Hull ...................................... 29/275

FOREIGN PATENT DOCUMENTS 705073 12/1979 U.S.S.R. ................................ 173/90
1070821 6/1967 United Kingdom ................ 173/126

*Primary Examiner*—Robert C. Watson

[57] ABSTRACT

A forcible entry tool is disclosed which enables law enforcement personnel such as SWAT teams or police or other persons such as fireman to breach a heavily fortified door or the like in a matter of seconds without the use of explosives. A ram is taught which is adjustable in weight to suit the needs of an individual and which may be inter-locked with another ram of the same structure in order to "gang" them and several can be locked together, forming a heavy, multi-manned battering ram.

5 Claims, 4 Drawing Sheets

28

34
36
38
40
42
47
48
50
52
54

46

44

44

14
38
42
52

FORCIBLE ENTRY TOOL

FIELD OF THE INVENTION

This invention relates to forcible entry tools and particularly to a tool used by law enforcement personnel in breaking open re-enforced doors or the like.

BACKGROUND OF THE INVENTION

Forcible entry tools are often used for performing various cutting and prying operations at fires, wrecks, etc. and are well documented in prior art such as the forcible entry tool of U.S. Pat. No. 3,219,316 which is carried by a single person and is designed to be a multi-purpose tool. Also a number of tools exist which teach combination tools designed to open vehicle doors such as U.S. Pat. Nos. 4,201,368 and 3,710,407 which again are designed to be used by one person.

Nail pullers, box openers and seal pullers, etc., also teach the use of a sliding member to "hammer" on a contact member to loosen or knock loose some elements, however, these tools are generally designed for some specific task and are used as a tool by one person.

The problems encountered by the use of such tools are numerous when trying to use such tools under a high stress situation where time is of the essence and immediate entry is required as occurs many times, especially in the law enforcement arena.

The present invention addresses these and other problems encountered by law-enforcement personnel which the prior art has not addressed in a satisfactory manner.

With the continuing escalation of gangs/drugs and the heavy incidence of armed suspects involved in the service of high risk warrants, hostage rescue, barricaded gunman with hardened and fortified entry points etc., many varied types of entry means have been used such as explosives, powered metal cutting tools, or sophisticated "burning" devices, however, each of these devises has it's own inherent problems such as noise, time-delays, fire hazard, etc. and are dangerous to the users and are expensive.

This type of situation has created a need for a simple, no-nonsense, reliable, durable, breaching device which can breach heavily fortified doors or the like in a matter of seconds which will afford the users such as SWAT teams and other law enforcement agencies, dependability, mobility and speed in the first critical seconds where the danger potential is extreme and suspect neutralization is critical.

Some of these problem have been addressed by patent application No. 653,167 of the present co-inventors which deals more particularly with doors that swing outwardly, while the present invention deals primarily with doors that swing inwardly.

In the past it has been common practice for law enforcement personnel to use a simple, hand held ram fabricated from a heavy bar or pipe with handles welded on and of a pre-determined weight and of a size and weight that one person could pick up and use, however, this results in each person having to use a different ram that is of a satisfactory weight and size that the person can handle. Larger, stronger personnel can handle larger rams, etc., while smaller persons can only handle rams of a lessor weight and size. Many entry points are in unusual places such as up several flights of stairs, in narrow hallways, around corners or obstruction or the like, and the ram must be carried by the personnel involved in a manner which is manageable and effective. This situation requires a number of different rams of different weights and sizes to be inventoried and made available and many times the most desirable weight and size is not available.

Again, this type of situation has created a need for a ram that is adjustable in weight which can be pre-set to a weight compatible to the personnel in question and is easily handled and hand friendly.

SUMMARY OF THE INVENTION

It is therefore a primary object of the present invention to provide a ram especially useful in opening fortified entry points such as doors and especially doors which swing inwardly that have been re-enforced with metal.

Another object is to provide a ram that is easily adjustable in weight.

Still another object is to provide a ram with hand friendly handles.

Another object is to provide a hand guard for the lead hand to protect the hand from breaking objects or splinters or the like.

Another important object is to provide a ram which is inter-locking with another ram of the same design and construction in order to "gang" multiple rams on site to allow multiple personnel to assemble quickly a longer multi-maned battering ram.

Other objects and advantages will become apparent when taken into consideration with the following drawings and specifications.

DETAILED DESCRIPTION OF THE DRAWINGS

Figure 1:
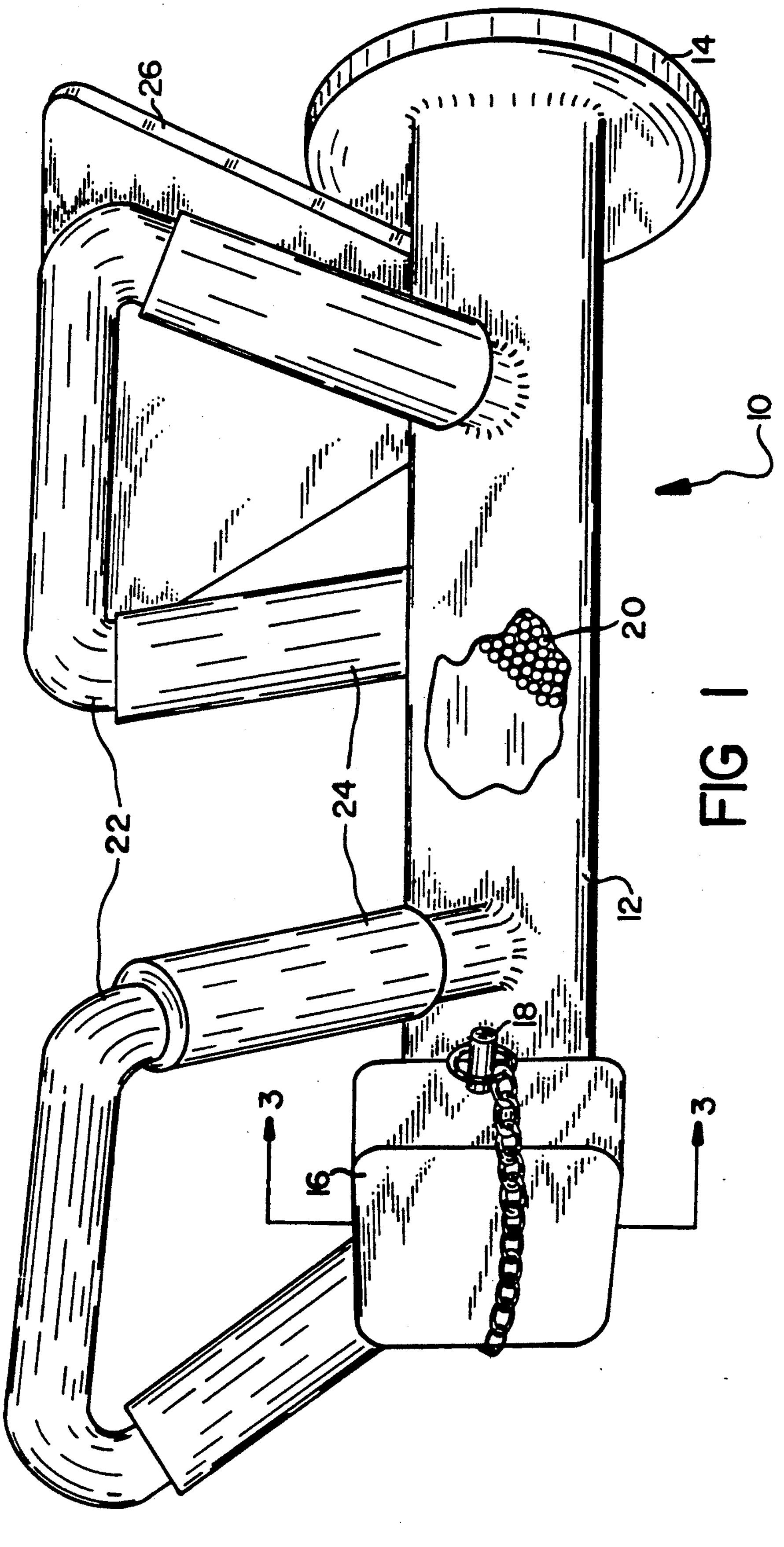
FIG. 1 is a perspective view of a first embodiment with a partial cut-a-way.

Referring now in detail to the drawings wherein like characters refer to like elements throughout the various drawings, in FIG. 1, 10 is an overview of a first embodiment with 12 being a substantially square, tubular member and 14 being a striking plate suitably affixed to one end of tubular member 12 by means such as welding with the distal end of tubular member 12 being covered by end cap 16 which is removably affixed to tubular member 12 by pull pin 18 through a suitable hole (not shown) in the end of tubular member 12. The tubular member 12 is suitably loaded with lead shot 20 or the like which may be increased or decreased to provide a preferable weight of the devise, with handles 22 being affixed to tubular member 12 by means such as welding and covered with a suitable material 24 such as rubber or foam rubber, with 26 being a suitable hand guard suitably affixed to tubular member 12 by means such as welding.

It will now be seen that this first embodiment teaches a simple one man ram which may be constructed of steel and which is hand friendly, has a hand guard and which may be adjustable in weight by removing the end cap and adding or removing small weights such as lead shot or the like until the operator is comfortable with the weight. The end cap is then replaced and retained in position by a pull pin.

Figure 3:
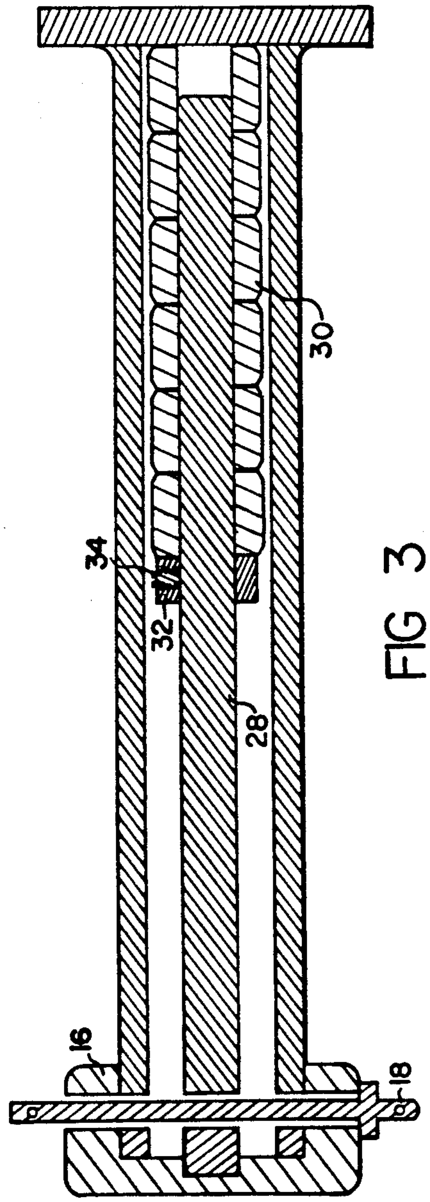
FIG. 3 is a section taken at 3—3 of FIG. 1 excluding the handles.
Figure 8:
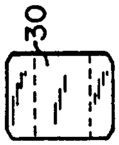
FIG. 8 is a side view of the weight of FIG. 7.
Figure 7:
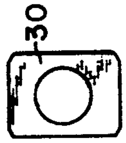
FIG. 7 is an end view of a weight.
Figure 6:
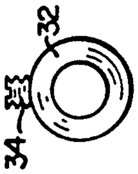
FIG. 6 is an end view of a collet.
Figure 5:
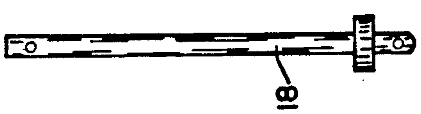
FIG. 5 is a perspective view of a locking pen.
Figure 2:
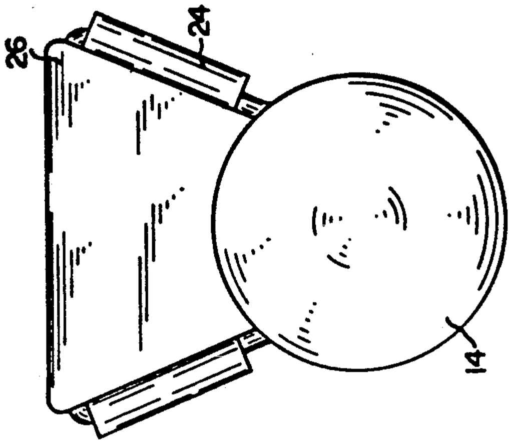
FIG. 2 is an end view of the striking end of the ram of FIG. 1.
Figure 4:
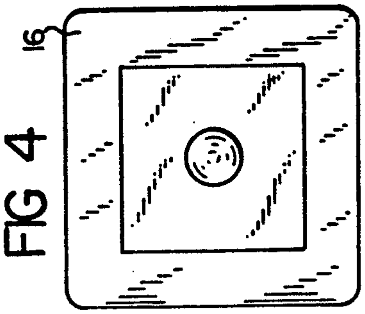
FIG. 4 is an inside end view of the end cap in FIG. 1

A second embodiment, which is a variation of the first embodiment, is shown in FIG. 3, which is substantially a cross section taken at 3—3 of FIG. 1 (without the handles) wherein the lead shot 20 is substituted by shaft 28, square "doughnut" like weights 30, collet and set screw 32 and 34, respectively, with shaft 28 and end cap 16 being held in a fixed relationship with the tubular member by pull pin 18.

It will now be seen that the steel shaft may be loaded with the "doughnut" weights made from a material such as lead and held in place by the collet and set screw and then placed into the tubular member. The end cap is then placed over the shaft, with the shaft and end cap being locked into place by the pull pen.

Figures 9, 10, 11, 12, 13, 14:
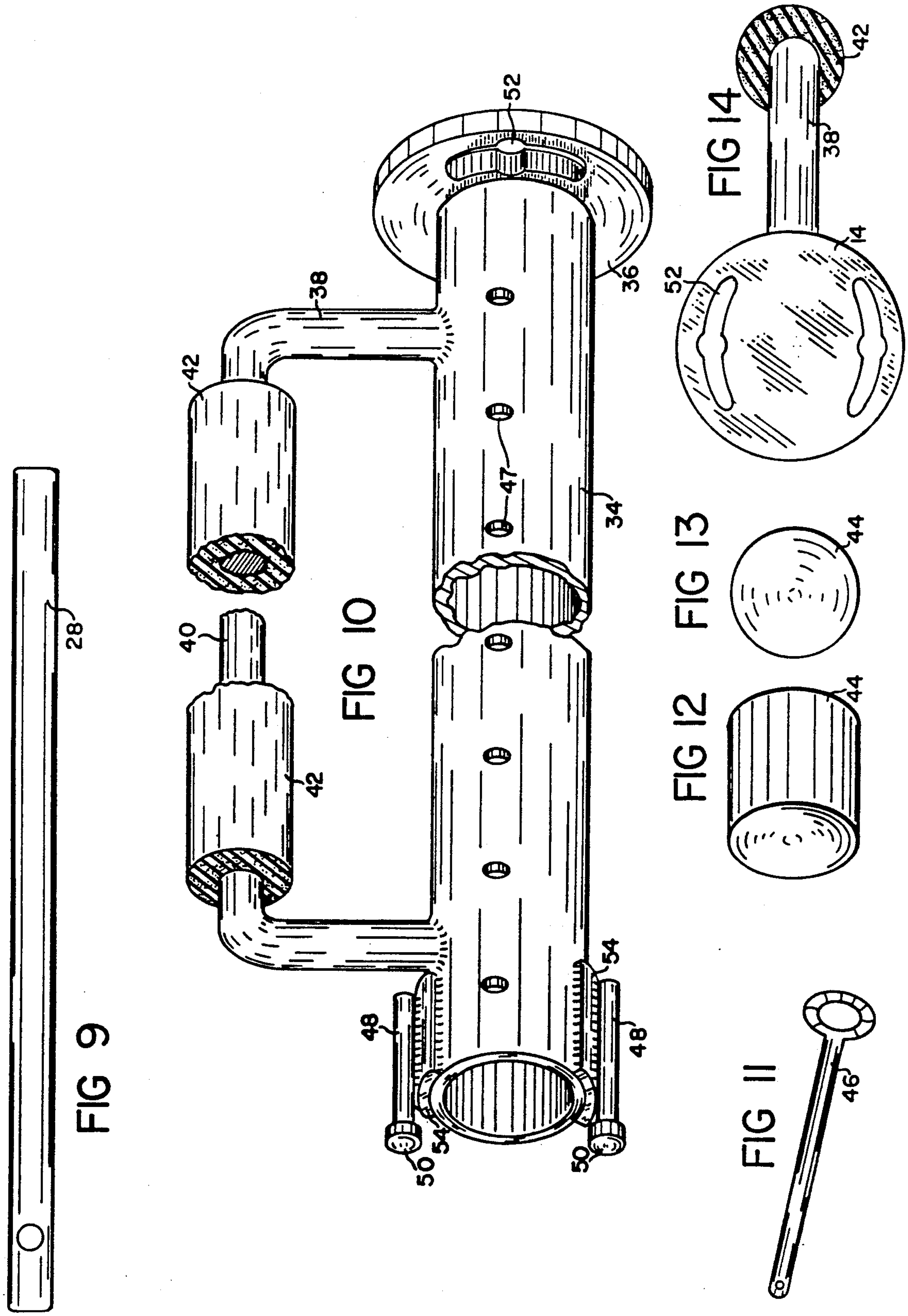
FIG. 9 is a perspective view of a shaft.
FIG. 10 is a perspective view of another embodiment.
FIG. 11 is a perspective view of a locking pin.
FIG. 12 is a perspective view of a weight.
FIG. 13 is an end view of the weight of FIG. 12.
FIG. 14 is an end view of the striking end of the embodiment shown in FIG. 10.

A third embodiment in FIG. 10, teaches a tubular member in the form of a steel pipe 34, a striking plate 36 and handle 38 being suitably affixed to tubular member 34 by suitable means such as welding and the hand-grip portion 40 being covered with a hand-friendly material such as rubber or foam rubber 42. 44 are slugs or pellets made from a material such as lead which are of a size and shape to slide into the pipe member 34 and are retained and positioned in place by pull pin 46 through holes 47, while 48 are pins suitably affixed to risers 54 by means such as welding, with risers 54 being suitably affixed to pipe member 34 by means such as welding, pins 48 having heads 50, heads 50 being of a size and shape to enter the center portion of slot 52.

Figure 15:
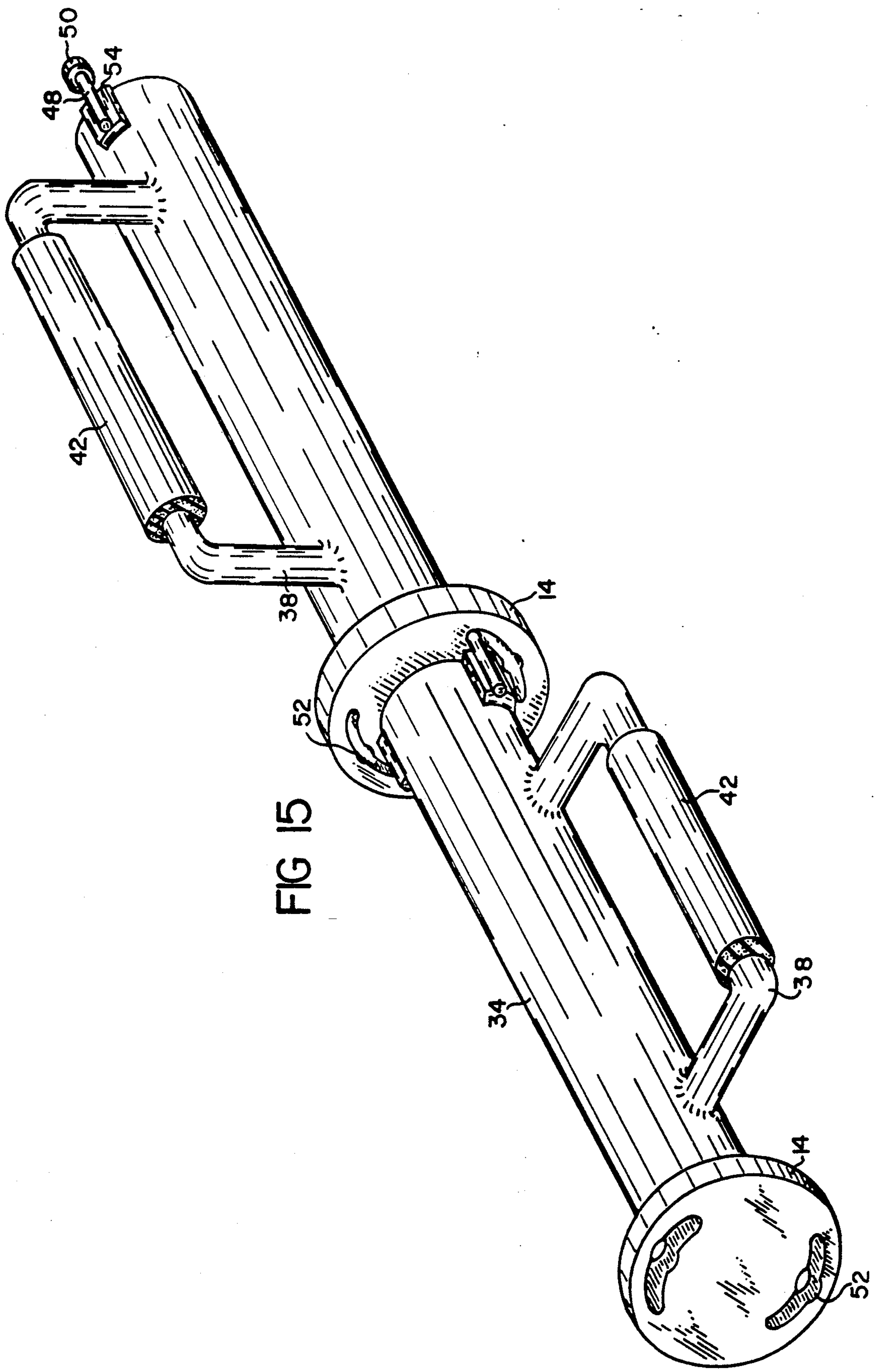
FIG. 15 is a perspective view of two of the devises shown in FIG. 10 being locked together.

It will now be seen that in the third embodiment, the devise may be loaded with slugs or pellets which are held in a frontal position by a pull pen which provides a means to vary the weight of the devise by adding or removing slugs. An added feature allows the devise to be inter-locked with another devise of similar construction and several of the devises may be "ganged" together to provide a battering ram which may be used by multiple personnel. It will also be noted in FIG. 15, when the devises are "ganged" together, that the handles are opposed to each other to allow the personnel to stand on opposite sides of the devise.

Although the invention has been shown and described in what is conceived to be the most practical and preferred embodiments, it is recognized that departures may be made therefrom within the scope and spirit of the invention, which is not to be limited to the details disclosed herein but is to be accorded the full scope of the claims so as to embrace any and all equivalent devises and apparatus.

Having described our invention, what we claim as new and desire to secure by Letters Patent is:

1. A forcible entry tool comprising; an elongated substantially round, hollow, steel tubular member having first and second ends, said tubular member having handle means, a bulkhead, said bulkhead being welded to said first end of said tubular member, multiple independent solid weights, said weights being of a shape and size small enough to enter said hollow tubular member, means to retain said multiple weights at substantially the said first end of said tubular member, at least two pins, said pins having heads, said pins being affixed lengthwise to said second end of said tubular member on its outside perimeter, said heads of said pins extending beyond said second end, said pins being affixed substantially opposite each other, said bulkhead having at least two slots, said slots having a working relationship with said pins of a duplicate entry tool, whereby, When said heads of said pins are engaged in said slots and said entry tool is twisted in relation to said duplicate entry tool, said first end of said entry tool is locked to said second end of said duplicate entry tool.

2. The tool of claim 1 in which said handle means is a rod, said rod being formed substantially in the shape of a U, said rod being welded at its ends to said tubular member.

3. The tool of claim 1 in which said means to affix said pin lengthwise to said second end of said tubular member is by welding.

4. The tool of claim 1 in which said weights are made of lead.

5. The tool of claim 1 in which said means to retain said multiple weights at substantially said first end of said tubular member, is a pin, said pin cooperating with multiple spaced holes in said tubular member.

* * * * *